US012695685B2

(12) United States Patent
Koetter et al.

(10) Patent No.: US 12,695,685 B2
(45) Date of Patent: Jul. 28, 2026

(54) REMOTE MANAGEMENT DEVICE ADAPTOR

(71) Applicant: Hewlett-Packard Development Company, L.P., Spring, TX (US)

(72) Inventors: Elisa Josefine Koetter, Fort Collins, CO (US); Peter Andrew Seiler, Wheatland, WY (US); Joseph-Jonathan Salzano, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 138 days.

(21) Appl. No.: 18/412,342

(22) Filed: Jan. 12, 2024

(65) Prior Publication Data

US 2025/0233814 A1     Jul. 17, 2025

(51) Int. Cl.
| | |
|---|---|
| *G06F 15/173* | (2006.01) |
| *G06F 8/65* | (2018.01) |
| *H04L 43/0817* | (2022.01) |

(52) U.S. Cl.
CPC ............ *H04L 43/0817* (2013.01); *G06F 8/65* (2013.01)

(58) Field of Classification Search
CPC ............................... H04L 43/0817; G06F 8/65
See application file for complete search history.

(56) References Cited

U.S. PATENT DOCUMENTS

| | | | | |
|---|---|---|---|---|
| 2006/0178993 A1* | 8/2006 | Ebihara | ............ | G11B 20/00391 |
| | | | | 705/50 |
| 2015/0347683 A1* | 12/2015 | Ansari | ................... | G16H 10/60 |
| | | | | 726/7 |
| 2017/0070362 A1* | 3/2017 | Tappeiner | ........... | H04L 12/2856 |
| 2022/0221844 A1* | 7/2022 | Amaro, Jr. | ........... | H04L 41/344 |
| 2023/0305834 A1* | 9/2023 | Kumar | ................. | G06F 9/4418 |

* cited by examiner

*Primary Examiner* — John B Walsh
(74) *Attorney, Agent, or Firm* — Quarles & Brady LLP

(57) ABSTRACT

The disclosed technology is directed to a remote management device adaptor for enabling a remote management device to manage a host device. In some examples, the remote management device adaptor receives a first signal of a first signal format from a host device, converts the first signal of the first signal format to a second signal of a second signal format, and transmits the second signal of the second signal format to the remote management device. The first signal format may be supported by the host device and unsupported by the remote management device, and the second signal may be unsupported by the host device and supported by the remote management device.

19 Claims, 3 Drawing Sheets

REMOTE MANAGEMENT DEVICE ADAPTOR

BACKGROUND

Generally described, computing devices can be configured with settings and commands implemented upon powering on the devices. Utilizing such settings and commands often requires physical access to the computing devices. However, not all computing devices are physically accessible to users who need to access the settings and commands of the computing devices.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some examples, the techniques described herein relate to a remote management device adaptor including: a first communication interface communicatively connected to a host device; a second communication interface communicatively connected to a remote management device; and a controller to: receive, through the first communication interface, a first signal of a first signal format from the host device, the first signal corresponding to a host status of the host device; convert the first signal of the first signal format to a second signal of a second signal format, the second signal including an indication of the host status in a format supported by the remote management device; and transmit, through the second communication interface, the second signal of the second signal format to the remote management device for managing the host device, wherein the first signal format is supported by the host device and unsupported by the remote management device, and wherein the second signal format is unsupported by the host device and supported by the remote management device.

In some examples, the techniques described herein relate to a remote management device adaptor, wherein the controller is to: determine that the first signal format is unsupported by the remote management device and that the second signal format is supported by the remote management device, wherein responsive to determining that the first signal format is unsupported by the remote management device and that the second signal format is supported by the remote management device, the controller converts the first signal of the first signal format to the second signal of the second signal format.

In some examples, the techniques described herein relate to a remote management device adaptor, wherein the controller is to: receive, through the second communication interface, a third signal of the second signal format from the remote management device, the third signal corresponding to a power control operation on the host device; convert the third signal of the second signal format to a fourth signal of the first signal format; and transmit, through the first communication interface, the fourth signal of the first signal format to the host device to cause the host device to be turned on or off.

In some examples, the techniques described herein relate to a remote management device adaptor, wherein the second communication interface is communicatively connected to the remote management device through a communication connection that is an Inter-Integrated Circuit (I2C), an Improved Inter-Integrated Circuit (I3C), a Universal Asynchronous Receiver/Transmitter (UART), a Bluetooth connection, a near-field communication (NFC), a Wi-Fi connection, a Zigbee connection, or a Serial Peripheral Interface (SPI).

In some examples, the techniques described herein relate to a remote management device adaptor, wherein the second communication interface includes a proprietary communication interface, and wherein the first communication interface includes a standard communication interface.

In some examples, the techniques described herein relate to a remote management device adaptor, wherein the controller receives the first signal from the host device through a first pin of the first communication interface, and wherein the first pin of the first communication interface is a general purpose input/output (GPIO) pin of the remote management device adaptor.

In some examples, the techniques described herein relate to a remote management device adaptor, wherein the GPIO pin of the remote management device adaptor is reconfigurable through a firmware update.

In some examples, the techniques described herein relate to a remote management device adaptor, wherein the remote management device adaptor connects to a connector of a mainboard of the host device.

In some examples, the techniques described herein relate to a computing system including: a mainboard; and a remote management device adaptor to: receive a first signal of a first signal format from the mainboard, the first signal corresponding to a status of the computing system; convert the first signal of the first signal format to a second signal of a second signal format, the second signal including an indication of the status of the computing system in a format supported by a remote management device; and transmit the second signal of the second signal format to the remote management device, wherein the first signal format is supported by the mainboard and unsupported by the remote management device, and wherein the second signal format is unsupported by the mainboard and supported by the remote management device.

In some examples, the techniques described herein relate to a computing system, wherein the remote management device adaptor is to: receive, from the mainboard, electrical power; measure the electrical power received from the mainboard; determine that the electrical power satisfies a criterion; and in response to determining that the electrical power satisfies the criterion, output a power signal to the remote management device.

In some examples, the techniques described herein relate to a computing system, wherein, to convert the first signal of the first signal format to the second signal of the second signal format, the remote management device adaptor adjusts a timing of the first signal.

In some examples, the techniques described herein relate to a computing system, wherein the remote management device adaptor is to: receive a third signal of the second signal format from the remote management device, the third signal corresponding to a power control operation on the mainboard; convert the third signal of the second signal format to a fourth signal of the first signal format; and transmit the fourth signal of the first signal format to the mainboard to cause the mainboard to be turned on or off.

In some examples, the techniques described herein relate to a computing system, wherein the remote management device adaptor is to: receive a firmware update from the remote management device; and update a firmware associated with the remote management device adaptor using the firmware update.

In some examples, the techniques described herein relate to a computing system, wherein the firmware associated with the remote management device adaptor is authenticated by the remote management device.

In some examples, the techniques described herein relate to a method for facilitating communications between a host device and a remote management device, the method including: by a remote management device adaptor, receiving a first signal of a first signal format from the host device; determining that the first signal format is unsupported by the remote management device; determining that a second signal format is supported by the remote management device; responsive to determining that the first signal format is unsupported by the remote management device and that the second signal format is supported by the remote management device, converting the first signal of the first signal format to a second signal of the second signal format; and transmitting the second signal of the second signal format to the remote management device for managing the host device, wherein the first signal format is supported by the host device, and wherein the second signal format is unsupported by the host device.

In some examples, the techniques described herein relate to a method, further including: by the remote management device adaptor, receiving power from the host device; and supplying the power to the remote management device.

In some examples, the techniques described herein relate to a method, wherein supplying the power to the remote management device includes: measuring the power received from the host device; determining that the power satisfies a criterion; and in response to determining that the power satisfies the criterion, regulating the power to be supplied to the remote management device.

In some examples, the techniques described herein relate to a method, wherein the first signal corresponds to a host status of the host device, and wherein the second signal includes an indication of the host status in a format supported by the remote management device.

In some examples, the techniques described herein relate to a method, further including: by the remote management device adaptor, receiving a third signal of the second signal format from the remote management device, the third signal generated based on the host status of the host device; converting the third signal of the second signal format to a fourth signal of the first signal format; and transmitting the fourth signal of the first signal format to the host device to cause the host device to be turned on or off.

In some examples, the techniques described herein relate to a method, further including: by the remote management device adaptor, receiving a firmware update from the remote management device; and updating a firmware associated with the remote management device adaptor using the firmware update.

BRIEF DESCRIPTION OF THE DRAWINGS

Throughout the drawings, reference numbers are re-used to indicate correspondence between referenced elements. The drawings are provided to illustrate examples of the subject matter described herein and not to limit the scope thereof.

DETAILED DESCRIPTION

Figure 1:
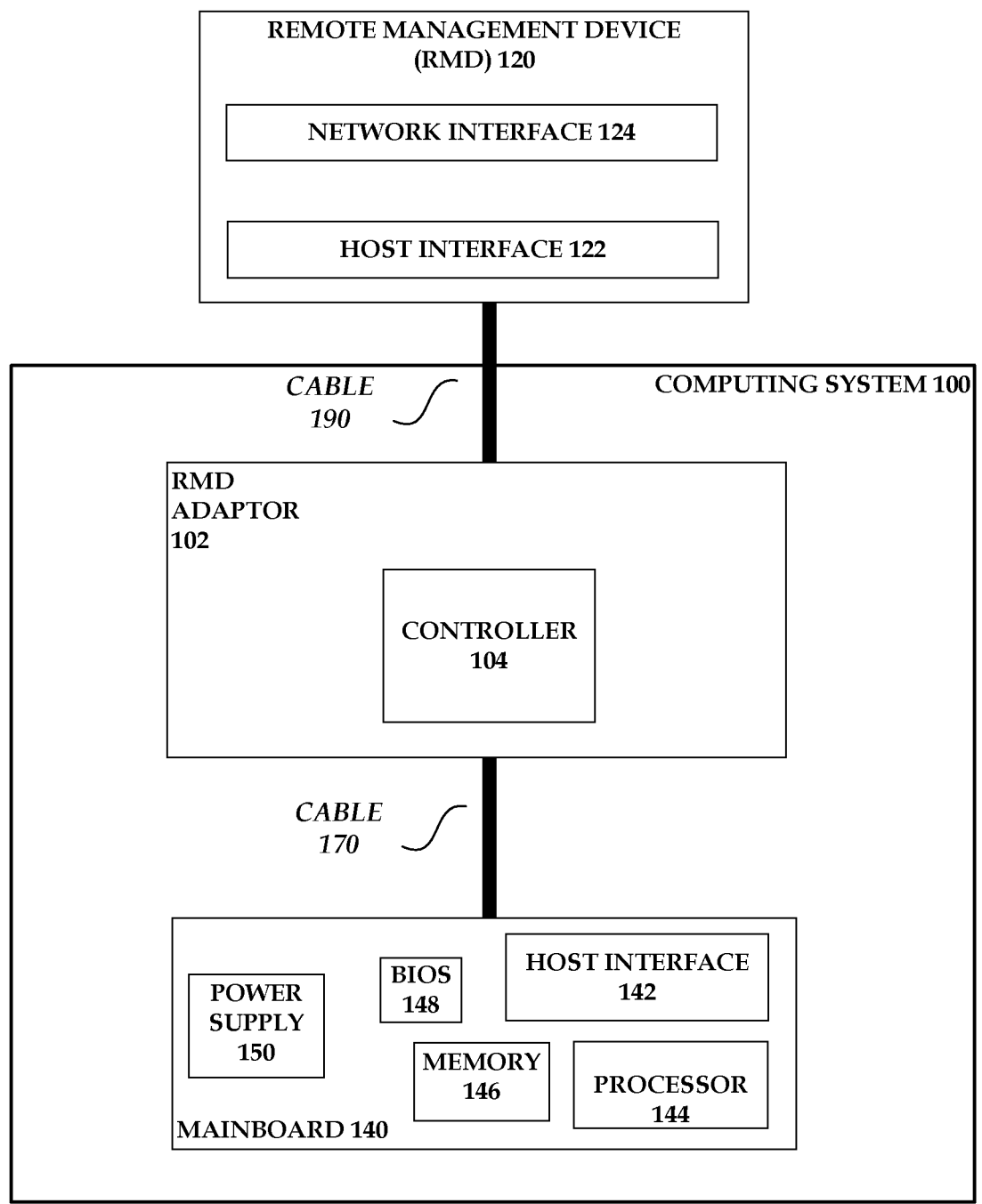
FIG. 1 illustrates a block diagram of an example computing system and an example remote management device in which examples of the present disclosure may be implemented.

A remote management peripheral (RMP) or a remote management device (RMD) may include a computing device that may be used alone or in connection with a another computing device (e.g., a server, a remote client computing device, etc.) to manage one or more host computing devices (e.g., workstation computers, laptop computers, notebook computers, desktop computers, other computing devices capable of communicating via a network, or any combination thereof) utilized by a user or an entity. For example, the remote management device may be used to perform out-of-band management tasks on a host computing device, such as pre-boot access, basic input output system (BIOS) updates, re-imaging, or the like. As another example, the RMD may be used to provide remote access to a computing device. Remote computing device access may be desirable to facilitate technical support or to access computing resources from a remote location. Further, the RMD may be used to provide support for certain types of peripherals (e.g., keyboards, display devices, mice, or other user interface devices) that may be connected to the computing device via the RMD.

In some cases, a remote management device may be designed for a specific computing device model or set of models. More specifically, the remote management device may be configured to operate with a particular hardware design, signal format, or communication protocol supported by one or more host computing device models. As such, the remote management device may not be utilized to manage host computing devices that adopt other hardware designs, signal formats or communication protocols, and may be only compatible with particular host computing devices.

To increase compatibility of a remote management device in a computing system, a remote management device adaptor may be employed by the computing system to facilitate communications between a host device and a remote management device that may not specifically be designed to operate with the host computing device. For example, a remote management device adaptor may include a Y-connector that allows a remote management device to communicate with certain host devices (e.g., workstations). As another example, a remote management device adaptor may be an Advanced Technology Extended (ATX) adaptor that enables a remote management device to communicate with an ATX compliant host device.

However, the compatibility of a remote management device in computing systems may still be constrained in the presence of a remote management device adaptor. For example, although an ATX adaptor may facilitate communications between a remote management device and an ATX compliant host device, the ATX adaptor may not facilitate communications between the remote management device and non-ATX compliant host devices. Additionally, operations capable of being performed between a remote management device and a host device may be limited by a specification supported by a remote management device adaptor. For example, although an ATX adaptor may allow functionalities such as host power control and host status monitoring to be performed by a remote management device, an ATX adaptor may not allow power sourcing from a host device to power the remote management device because of limitations of the ATX specification.

As such, it may be desirable to implement a remote management device adaptor that increases interoperability among remote management devices and host devices without being constrained by specifications or protocols supported by remote management devices and host devices. Some examples of the present disclosure improve compatibility of a remote management device or a host device by utilizing a remote management device adaptor that converts (e.g., translates) signals received from or transmitted to the remote management device or the host device. For example, a controller (e.g., a microcontroller) of a remote management device adaptor may convert a first signal received from a host device that is unsupported by a remote management device to a second signal that is supported by the remote management device, and transmit the second signal to the remote management device. As another example, a controller of a remote management device adaptor may convert a first signal received from a remote management device that is unsupported by a host device to a second signal that is supported by the host device, and transmit the second signal to the host device. Thus, the remote management device adaptor in accordance with some examples of the present disclosure may facilitate communications between various types of remote management devices and host devices. Advantageously, the remote management device adaptor may allow a remote management device that is designed for a specific type of host devices to manage various types of host devices or computing systems.

In some examples, a remote management device adaptor may include a first communication interface, a second communication interface, and a controller. The first communication interface is communicatively connected to a host device. The second communication interface is communicatively connected to a remote management device. The controller may receive, through the first communication interface, a first signal of a first signal format from the host device. The first signal may correspond to a host status of the host device. The first signal format may be supported by the host device, and unsupported by the remote management device. The controller may convert the first signal of the first signal format to a second signal of a second signal format. In some examples, when converting the first signal of the first signal format to the second signal of the second signal format, the controller may adjust a timing of the first signal to obtain the second signal. The second signal may indicate the host status in a format supported by the remote management device. The second signal format may be unsupported by the host device, and supported by the remote management device. The controller may then transmit, through the second communication interface, the second signal of the second signal format to the remote management device for managing the host device.

In some examples, the controller may determine that the first signal format is unsupported by the remote management device, and determine that the second signal format is supported by the remote management device. Responsive to determining that the first signal format is unsupported by the remote management device and that the second signal format is supported by the remote management device, the controller may convert the first signal of the first signal format to the second signal of the second signal format.

Additionally and/or optionally, the controller may receive, through the second communication interface, a third signal of the second signal format from the remote management device. The third signal may correspond to a power control operation on the host device, such as shutting down or turning on the host device. The controller may convert the third signal of the second signal format to a fourth signal of the first signal format. The controller may then transmit, through the first communication interface, the fourth signal of the first signal format to the host device to cause the host device to be turned on or off.

In some examples, the RMD adaptor may be capable of receiving an update over a network. For example, the RMD adaptor may receive a firmware update that enables the RMD adaptor to support additional RMDs or signal formats not previously supported by the RMD adaptor. The firmware update may enable the remote management device adaptor to determine or identify signal format(s) supported by the remote management device or the host device not previously supported or identifiable by the RMD adaptor.

Additionally and/or alternatively, the remote management device adaptor may receive the firmware update from the remote management device and update the firmware associated with the remote management device adaptor using the firmware update for adding one or more supported signal formats. For example, when a remote management device supports a particular signal format, the remote management device adaptor may update the firmware associated with the remote management device adaptor such that the remote management device adaptor may convert a signal received from a host device to another signal of the particular signal format supported by the remote management device before transmitting the other signal to the remote management device. As another example, when a host device supports a particular signal format, the remote management device adaptor may update the firmware associated with the remote management device adaptor such that the remote management device adaptor may convert a signal received from a remote management device to another signal of the particular signal format supported by the host device before transmitting the other signal to the host device.

In some examples, a remote management device adaptor may receive electrical power from a host device. The remote management device adaptor may then supply the electrical power to the remote management device. In some examples, to supply the electrical power to the remote management device, the remote management device adaptor may measure the electrical power received from the host device, and determine whether the electrical power satisfies one or more criteria. The criteria may include any characteristics of the electrical power that may be used as a basis to determine whether to supply power. For example, the criterion may be that a voltage of the electrical power is within a particular range. For example, the remote management device adaptor may determine that the voltage of the electrical power is within the particular range. In response to determining that the electrical power satisfies the criterion, the remote management device adaptor may regulate the electrical power to be supplied to the remote management device or output a power signal to the remote management device. The power signal may meet an input power specification associated with the remote management device. In cases where it is determined that the electrical power does not satisfy the one or more criteria, the remote management device adaptor may not supply the electrical power to the remote management device. Alternatively, in cases where the power criteria are not satisfied but a minimum power criteria is satisfied, power may be supplied and a warning may be output for display to a user indicating that power does not satisfy the power criteria.

In some examples, the disclosed examples may be implemented in hardware, firmware, software, or any combination thereof. The disclosed examples may be implemented as instructions stored in a transitory or non-transitory computer-readable storage medium, which may be read and executed by a processor core or thread. Further, the instructions may be updated and/or obtained from a remote server via a network connection.

Example Computing System

FIG. 1 illustrates a block diagram of an example computing system 100 and an example remote management device (RMD) 120 in which examples of the present disclosure may be implemented. In some examples, the computing system 100 may be a host device that may be accessed by the RMD 120 through a RMD adaptor 102. To enable the RMD 120 to access the computing system 100, a host interface 122 of the RMD 120 may communicate with a host interface 142 of a mainboard 140 through the RMD adaptor 102, cable 190 and cable 170. Examples of the computing system 100 may include, but not limited to, laptops, desktops, workstations, compute servers, tablets, wearable computers, smartphones, and personal digital assistants (PDA), hybrid PDA/mobile phone, set-top box, voice command device, and digital media player.

In some examples, the computing system 100 (e.g., a host device) includes the RMD adaptor 102 and the mainboard 140. The RMD adaptor 102 may include a controller 104 to facilitate communications between the RMD 120 and the mainboard 140. The mainboard 140 may include a host interface 142, a processor 144, a memory 146, a basic input/output system (BIOS) 148, and a power supply 150. In some examples, the RMD adaptor 102 may be connected to a connector (e.g., a cable header or a socket not shown in FIG. 1) of the mainboard 140. The RMD 120 may include the host interface 122 and a network interface 124. The network interface 124 may enable a user (e.g., a remote user) of the RMD 120 to communicate with the RMD 120 with an electronic device (not shown in FIG. 1) operated by the user.

Although the RMD adaptor 102 is illustrated to be internal to or integrated with the computing system 100, it should be noted that the RMD adaptor 102 may be external to or deployed outside of the computing system 100 in other examples. Although the connections between the RMD 120, the RMD adaptor 102 and the mainboard 140 are illustrated to be cable connections (e.g., the cable 190 and the cable 170), some of the connections between the RMD 120, the RMD adaptor 102 and the mainboard 140 may be facilitated by other types of wired connections, or wireless connections. For example, the host interface 122 may communicate with the RMD adaptor 102 through wireless connections. As another example, the RMD adaptor 102 may be connected directly to the mainboard 140 through a direct connection (e.g., via pins or bumps, etc.) rather than via a cable.

In some examples, the RMD adaptor 102 may receive a first signal of a first signal format from the mainboard 140. In some examples, a signal format may correspond to or represent at least one of a timing, a pattern (e.g., a square wave, a triangular wave, or a pulse width), a voltage swing, a transition (e.g., from a high voltage to a low voltage), a duration, or a duty cycle of a signal.

In some examples, a signal format may be defined by more than one signal or different utilization of communication connections. More specifically, various signal formats may be defined based on the use of various wires within the cable 190 and/or the cable 170 by designating respective wires for conveying different information. For example, a first signal format may correspond to utilizing a first wire of the cable 190 for transmitting a host status of the computing system 100, utilizing a second wire of the cable 190 for transmitting a power signal received from the computing system 100, and utilizing a third wire of the cable 190 for transmitting ground voltage from the computing system 100 to the RMD 120. A second signal format may correspond to utilizing the first wire of the cable 190 for transmitting a mouse input from the RMD 120 to the computing system 100, utilizing the second wire of the cable 190 for transmitting the host status of the computing system 100, and utilizing the third wire of the cable 190 for transmitting a power signal received from the computing system 100.

In some examples, a signal format may be defined in a standardized specification or a proprietary specification. In some examples, a signal format may be supported by the RMD 120 (e.g., the RMD 120 is able to process a signal of the signal format) but unsupported by the mainboard 140 (e.g., the mainboard 140 is not able to process a signal of the signal format), or vice versa (e.g., the RMD 120 is not able to process a signal of the signal format but the mainboard 140 is able to process a signal of the signal format).

As such, when a signal is transmitted based on different signal formats, it may mean that the signal is transmitted using different signal timings, patterns, amplitudes, transitions, durations, or duty cycles. For example, when a host status signal is transmitted based on a first signal format from the mainboard 140 to the RMD adaptor 102, it may mean that the host status signal is transmitted by using a low voltage (e.g., 0 V) to indicate logic 0 and a high voltage (e.g., 5 V) to indicate logic 1; when a host status signal is transmitted based on a second signal format from the RMD adaptor 102 to the RMD 120, it may mean that the host status is transmitted by using a high voltage (e.g., 3 V) to indicate logic 0 and a low voltage (e.g., 1 V) to indicate logic 1.

Additionally and/or alternatively, transmitting a signal based on different signal formats may mean that the signal is transmitted using different wire configurations, such as transmitting the signal using various wires of the cable 190 or the cable 170. For example, when a power control signal of a first signal format is transmitted through the cable 170, it may mean that the power control signal is transmitted using a first number of wire(s) of the cable 170; and when a power control signal of a second signal format is transmitted through the cable 190, it may mean that the power control signal is transmitted using a second number of wire(s) of the cable 170, with the second number being different from the first number. For example, a power control signal of a first signal format may be transmitted using two wires of the cable 170, and a power control signal of a second signal format may be transmitted using one wire of the cable 190.

In some examples, the first signal may correspond to a status (e.g., a host status) of the computing system 100. For example, the first signal may indicate that the mainboard 140 or the computing system 100 is in a power on, a power off, or a sleep state. The first signal format may comply with a signal format defined in a standardized specification (e.g., the ATX specification). The mainboard 140 or the computing system 100 may support the signal format defined in the standardized specification and support the first signal format, but the RMD 120 may not support the signal format defined in the standardized specification and may not support the first signal format.

The RMD adaptor 102 may convert the first signal of the first signal format to a second signal of a second signal format. The second signal may indicate the status of the computing system 100 in a format supported by the RMD 120. The RMD adaptor 102 may transmit the second signal of the second signal format to the RMD 120. Additionally, and/or optionally, prior to converting the first signal of the first signal format to the second signal of the second signal format, the RMD adaptor 102 (e.g., the controller 104) may determine that the first signal format is unsupported by the RMD 120 and that the second signal format is supported by the RMD 120. Responsive to determining that the first signal format is unsupported by the RMD 120 and that the second signal format is supported by the RMD 120, the RMD adaptor 102 (e.g., the controller 104) may convert the first signal of the first signal format to the second signal of the second signal format for transmitting the second signal of the second signal format to the RMD 120.

In some examples, the controller 104 of the RMD adaptor 102 may be a microcontroller, a micro control unit (MCU), a microprocessor, or other type of processor or processing/controlling circuit capable of performing functions as described herein. The controller 104 may be implemented by hardware, software, firmware, or any combination thereof. In some examples, the controller 104 may be updated through a firmware update to support various signal formats conversion or translation between the RMD 120 and the mainboard 140. For example, the RMD adaptor 102 may receive the firmware update from the RMD 120 and utilize the firmware update to update the controller 104 such that the controller 104 may determine additional signal formats supported by the RMD 120 and/or the mainboard 140, or convert signals to a particular signal format that is supported by the RMD 120 and/or the mainboard 140.

In some examples, the processor 144 deployed on the mainboard 140 may be embodied as any type of multi-core or multi-thread processor. The processor 144 may be embodied as a microprocessor, central processing unit (CPU), digital signal processor, microcontroller, a graphics processing unit (GPU), or other processor or processing/controlling circuit. Although not illustrated in FIG. 1, the processor 144 can communicate with the host interface 142 for processing signals received from the RMD 120 through the RMD adaptor 102 or transmitting signals to the RMD 120 through the RMD adaptor 102. Further, the processor 144 may directly or indirectly (not shown in FIG. 1) communicate with the memory 146, the BIOS 148, and the power supply 150. For example, the processor 144 may communicate with the memory 146 and the BIOS 148 to access data and instructions stored in the memory 146 and the BIOS 148 to perform various functions.

In some examples, the memory 146 may be embodied as any type of volatile or non-volatile memory or data storage, such as dynamic random access memory (DRAM), static random access memory (SRAM), synchronous DRAM (SDRAM), double data rate synchronous dynamic random access memory (DDR SDRAM). The memory 146 may store various data and program code used during operation of the computing system 100, including operating systems, application programs, libraries, driver, and the like. As indicated above, the memory 146 may be communicatively coupled to the processor 144 through bus interfaces (not shown in FIG. 1).

In some examples, the basic input/output system (BIOS) 148 refers to hardware or hardware and instructions to initialize, control, or operate a computing device prior to execution of an operating system (OS) of the computing system 100. Instructions included within the BIOS 148 may be software, firmware, microcode, or other programming that defines or controls functionality or operation of the BIOS 148. In some examples, the BIOS 148 may be implemented using instructions, such as platform firmware of a computing device, executable by a processor. The BIOS 148 may operate or execute prior to the execution of the OS of the computing system 100. The BIOS 148 may initialize, control, or operate components such as hardware components of a computing device and may load or boot the OS of the computing system 100. In some examples, the BIOS 148 may provide or establish an interface between hardware devices or platform firmware of the computing device and OS of the computing system 100, via which the OS of the computing system 100 may control or operate hardware devices or platform firmware of the computing system 100. In some examples, the BIOS 148 may implement the Unified Extensible Firmware Interface (UEFI) specification or another specification or standard for initializing, controlling, or operating a computing system 100.

In some examples, the power supply 150 may receive an alternating current (AC) power source (not shown in FIG. 1) and generate supply voltage(s) for one or more components (e.g., the processor 144 and the host interface 142) of the computing system 100. The power supply 150 may be attached to a chassis (not shown) of the computing system 100. In some examples, the power supply 150 may be compatible with the ATX specification (e.g., the ATX 1.0, the ATX 2.0, or the ATX 3.0). As will be described with greater detail below, the power supply 150 may also supply power to the RMD 120 through the RMD adaptor 102.

In some examples, the host interface 142 may include a plurality of pins (not shown in FIG. 1) to interface with the RMD adaptor 102. In some examples, the host interface 122 of the RMD 120 may include a plurality of pins (not shown in FIG. 1) to interface with the RMD adaptor 102. As such, the RMD 120 may communicate with the mainboard 140 through the host interface 122 and the RMD adaptor 102, and the mainboard 140 may communicate with the RMD 120 through the host interface 142 and the RMD adaptor 102.

Example RMD Adaptor and Related Block Diagrams

Figure 2:
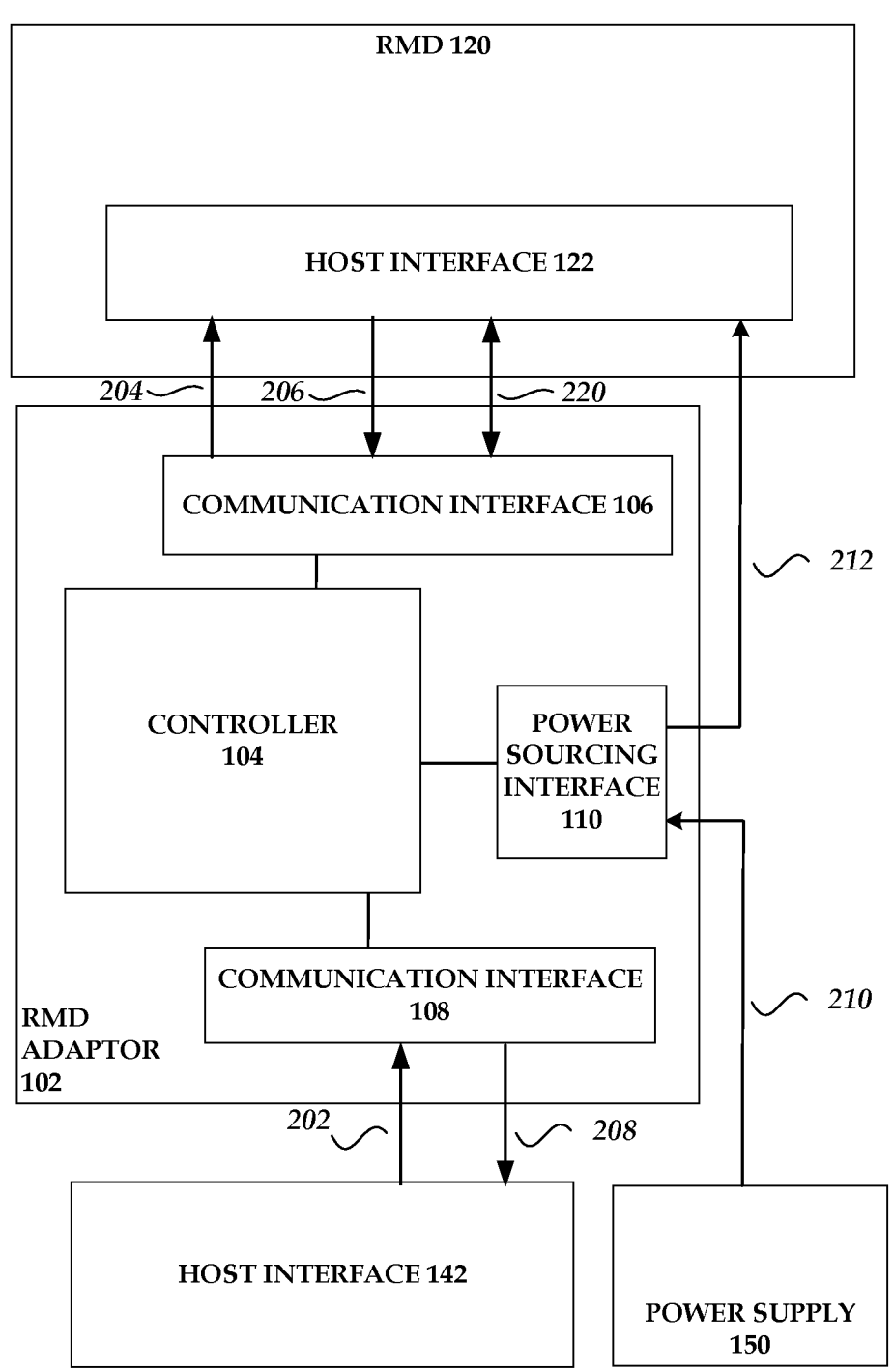
FIG. 2 illustrates an example block diagram of a remote management device adaptor, and host interfaces that can be utilized to enable the remote management device of FIG. 1 to manage the computing system of FIG. 1 in accordance with some examples of the present disclosure.

FIG. 2 illustrates an example block diagram of the RMD adaptor 102, the host interface 122, and the host interface 142. The RMD adaptor 102 may include the controller 104, a communication interface 108, a communication interface 106, and a power sourcing interface 110. The controller 104 may control the communication interface 108 and the communication interface 106 for facilitating communications between the RMD 120 and the computing system 100 (e.g., a host device) in accordance with some examples of the present disclosure. The controller 104 may control the power sourcing interface 110 to supply power from the power supply 150 to the RMD 120 in accordance with some examples of the present disclosure.

In some examples, the host interface 122 may communicate with the communication interface 106 through a communication connection 204, a communication connection 206, and a communication connection 220. Each of the communication connections 204, 206 and 220 can encompass one or more wires, pins, bumps, or the like, and may be utilized to transmit various signals. For example, the communication connection 204 may include multiple wires that are connected by multiple pins within the communication interface 106 and multiple pins within the host interface 122.

In some examples, the host interface 142 may communicate with the communication interface 108 through a communication connection 202 and a communication connection 208. Each of the communication connections 202 and 220 can encompass one or more wires, pins, bumps, or the like, and may be utilized to transmit various signals. For example, the communication connection 208 may include multiple wires that are connected by multiple pins within the communication interface 108 and multiple pins within the host interface 142.

In some examples, the communication connection 202 may be utilized to transmit a host status of the computing system 100 from the host interface 142 to the communication interface 108. The communication connection 204 may be utilized to transmit a host status of the computing system 100 from the communication interface 106 to the host interface 122. The communication connection 206 may be utilized to transmit a power control signal to turn on or off the computing system 100 from the host interface 122 to the communication interface 106. The communication connection 208 may be utilized to transmit a power control signal to turn on or off the computing system 100 from the communication interface 108 to the host interface 142. The communication connection 220 may be utilized to transmit various data signals, control signals, or any information that enables the RMD 120 to access the computing system 100 from the host interface 122 to the communication interface 106 or from the communication interface 106 to the host interface 122. In some examples, each of the communication connections 202, 204, 206, 208, and 220 may be reconfigured for various purposes through a firmware update associated with the RMD adaptor 102 or the controller 104.

As illustrated in FIG. 2, the communication interface 108 of the RMD adaptor 102 is communicatively connected to the host interface 142 of the mainboard 140. More specifically, the communication interface 108 is communicatively connected to the host interface 142 through the communication connections 202 and 208. Further, the communication interface 106 of the RMD adaptor 102 is communicatively connected to the host interface 122 of the RMD 120. More specifically, the communication interface 106 is communicatively connected to the host interface 122 through the communication connections 204, 206 and 220. As illustrated in FIG. 2, the power sourcing interface 110 is communicatively connected to the power supply 150 through a communication connection 210, and the power sourcing interface 110 is communicatively connected to the RMD 120 (e.g., the host interface 122) through a communication connection 212.

In some examples, the controller 104 may receive a first signal of a first signal format from the host interface 142 through the communication connection 202. As noted above, the communication connection 202 may encompass one or more wires for transmitting the first signal of the first signal format. In some examples, the first signal may correspond to a data signal, a control signal, or any other type of signal. In some examples, the first signal may correspond to a host status of the computing system 100. The host status may indicate that the computing system 100 or the mainboard 140 is in a power on or a power off state. The controller 104 may convert the first signal of the first signal format received by the communication interface 108 to a second signal of a second signal format. For example, the controller 104 may adjust a timing of the first signal to obtain the second signal having a signal timing that is supported by the RMD 120. The second signal may indicate the host status of the computing system 100 in a format that is supported by the RMD 120. After conversion, the communication interface 106 may transmit the second signal of the second signal format to the RMD 120 (e.g., the host interface 122) through the communication connection 204.

In some examples, before transmitting the second signal from the communication interface 106 to the host interface 122, the controller 104 may determine that the first signal format is unsupported by the RMD 120 and that the second signal format is supported by the RMD 120. Responsive to determining that the first signal format is unsupported by the RMD 120 and that the second signal format is supported by the RMD 120, the controller 104 may convert the first signal of the first signal format to the second signal of the second signal format.

In some examples, the controller 104 may receive a third signal of the second signal format from the RMD 120 through the communication connection 206. In some examples, the third signal may correspond to a data signal, a control signal, or any other type of signal. In some examples, the third signal may correspond to a power control operation on the computing system 100. The third signal may be generated by the RMD 120 based on the second signal discussed above. For example, when the second signal indicates that the computing system 100 is in a power off state, the third signal may be generated by the RMD 120 to cause the computing system 100 to be turned on or powered on. As another example, when the second signal indicates that the computing system 100 is in a power on state, the third signal may be generated by the RMD 120 to cause the computing system 100 to be turned off or powered off. The controller 104 may convert the third signal of the second signal format to a fourth signal of the first signal format. The controller 104 may then transmit the fourth signal of the first signal format to the computing system 100 through the communication interface 108 and the communication connection 208 to cause the computing system 100 (e.g., the mainboard 140) to be turned on or off.

In some examples, the communication interface 106 is communicatively connected to the RMD 120 (e.g., the host interface 122) through a communication bus or any other type of communication connection 220. For example, the communication connection may use or may be one of an Inter-Integrated Circuit (I2C), an Improved Inter-Integrated Circuit (I3C), a Universal Asynchronous Receiver/Transmitter (UART), a Bluetooth connection, a near-field communication (NFC), a Wi-Fi connection, a Zigbee connection, or a Serial Peripheral Interface (SPI), and the like. In other examples, the communication interface 106 communicates with the RMD 120 based on a proprietary communication protocol and the communication interface 108 communicates with the computing system 100 based on a standard communication protocol.

In some examples, some or all of the pins (not shown in FIG. 2) within the communication interface 106 or the communication interface 108 may be general purpose input/output (GPIO) pin(s) that are reconfigurable to receive signals of various signal formats. For example, a pin (not shown in FIG. 2) of the communication interface 106 may be a GPIO pin that is reconfigurable based on a determined signal format supported by the RMD 120. In some cases, the RMD adaptor 102 may receive a firmware update that causes the GPIO pin to be reconfigured. The firmware update may be received from the RMD 120, and may be utilized to update the controller 104 in addition to reconfiguring the pin of the communication interface 106 or other pins of the RMD adaptor 102. For example, if a pin of the communication interface 106 is configured as an output, the pin may be reconfigured to serve as an input to receive an input signal from the host interface 122. Alternatively, if the pin is configured as an input pin, the pin may be reconfigured to function as an output pin to transmit an output signal to the host interface 122 or as a bidirectional pin to receive an input signal from the host interface 122 or transmit an output signal to the host interface 122. Additionally, and/or optionally, the pin may be reconfigured to receive various signal formats, transitions, or definitions. For example, the pin may be reconfigured to transmit the second signal discussed above using a low voltage (e.g., 0 V) to a high voltage (e.g., 5 V) transition to indicate that the computing system 100 is in a power off state and transmit the second signal using the low voltage (e.g., 0 V) to the high voltage (e.g., 5 V) transition to indicate that the computing system 100 is in a power on state.

In some examples, in addition to enabling the RMD 120 to access the computing system 100, the RMD adaptor 102 may facilitate or regulate power provisioned from the computing system 100 to the RMD 120 through the power sourcing interface 110. For example, the power sourcing interface 110 may receive electrical power from the power supply 150 or other component(s) of the mainboard 140 through the communication connection 210. The controller 104 and/or the power sourcing interface 110 may measure the electrical power and determine that the electrical power satisfies a criterion. The criterion may be that an amount of the electrical power or a voltage of the electrical power is within a particular range. In response to determining that the electrical power satisfies the criterion, the power sourcing interface 110 may output a power signal to the host interface 122 through the communication connection 212. The power signal may be regulated (e.g., through a voltage regulator of the power sourcing interface 110) by the power sourcing interface 110 to meet a power provision specification associated with the RMD 120.

It should be noted that multiple pins may be utilized to supply power from the power supply 150 to the host interface 122 through the power sourcing interface 110. In some examples, the power supply 150 may utilize several pins (e.g., 4, 8, 12, 16, 24, etc.) to supply power to the power sourcing interface 110. The power sourcing interface 110 may regulate power received from the power supply 150, and supply the regulated power to the host interface 122 through multiple pins (e.g., 4, 8, 12, 16, 24, or the like).

In some examples, the controller 104 may further communicate with the RMD 120 for implementing various functions in accordance with examples of the present disclosure. The further communications between the RMD 120 and the controller 104 may be facilitated by the communication connection 220. For example, the controller 104 may communicate with the RMD 120 through the communication connection 220 to receive a firmware update for the RMD adaptor 102 or the controller 104. The firmware update may enable the controller 104 to convert signals among more signal formats compared with situations when the firmware associated with the controller 104 is not updated. The RMD adaptor 102 may further utilize a firmware update for other functionalities, such as to enable accessing additional status data of the computing system 100, address bugs associated with the computing system 100 or the RMD 120, handle vulnerabilities associated with the computing system 100 or the RMD 120, etc.

In some examples, when the RMD 120 supports a particular signal format, the firmware update may enable the controller 104 to convert a signal received from the computing system 100 to another signal of the particular signal format supported by the RMD 120 before transmitting the other signal to the RMD 120. As another example, when the computing system 100 or the mainboard 140 supports a particular signal format, the firmware updated may enable the controller 104 to convert a signal received from the RMD 120 to another signal of the particular signal format supported by the computing system 100 or the mainboard 140 before transmitting the other signal to the computing system 100 or the mainboard 140.

Additionally and/or optionally, the RMD 120 may communicate with the controller 104 through the communication connection 220 to authenticate the firmware associated with the RMD adaptor 102 or the controller 104. Advantageously, authenticating the firmware associated with the controller 104 allows the computing system 100 or the RMD 120 to determine that the firmware associated with the controller 104 is authentic and has not been tampered with, thereby enhancing security of the computing system 100 or the RMD 120. Additionally, authenticating the firmware associated with the controller 104 ensures that the firmware associated with the controller 104 is received from a legitimate source.

Example Voltage Regulator Control Process

Figure 3:
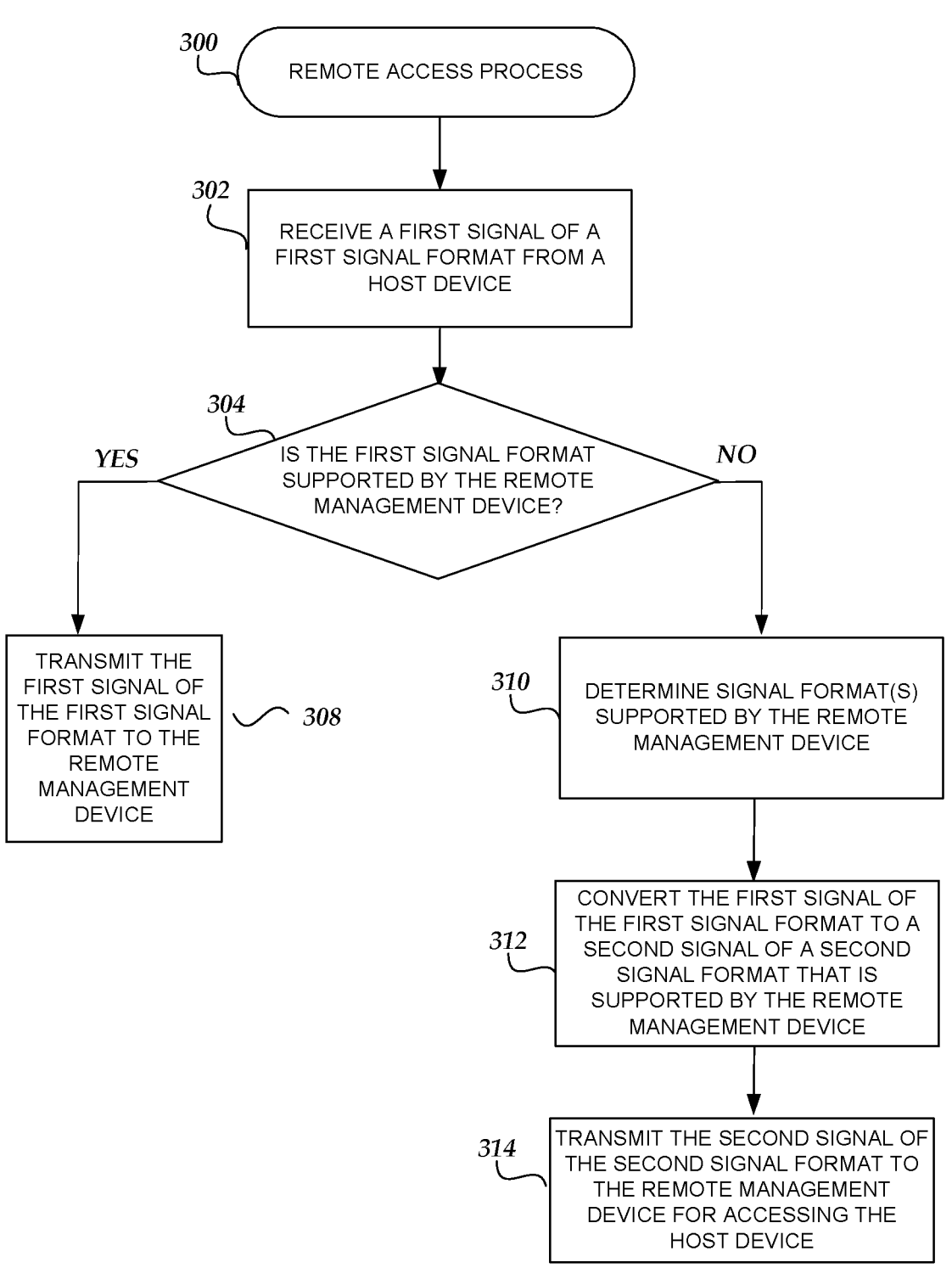
FIG. 3 depicts a flowchart of an example remote management process in accordance with some examples of the present disclosure.

With reference to FIG. 3, an illustrative remote access process 300 for enabling a remote management device to access a host device will be described. The process 300 may be implemented by any system that can convert a signal formatted in accordance with one format or communication standard to a signal formatted in accordance with another format or communication standard. For example, the process 300 may be implemented by the RMD adaptor 102.

The process 300 begins at block 302. At block 302, the RMD adaptor 102 receives a first signal of a first signal format from a host device. For example, the controller 104 may receive the first signal from the host interface 142 of the mainboard 140 of the computing system 100 through the communication connection 202. The first signal may correspond to various kinds of signals, such as a status of the computing system 100, a control signal, a power signal, a power control signal, a data signal, or any other communication signals that are meant to be transmitted between the computing system 100 and the RMD 120. For example, the first signal may correspond to a host status signal indicating that the computing system 100 is in a power on or a power off state. In other examples, the first signal may be any other signals, such as data signals or other control signals that facilitate interaction between the RMD 120 and the computing system 100.

In some examples, the first signal format may be supported by the mainboard 140, but may be unsupported by the RMD 120. For example, the first signal format may comply with a signal format defined in the ATX specification. The mainboard 140 may support the signal format defined in the ATX specification and support the first signal format, but the RMD 120 may not support the signal format defined in the ATX specification and may not support the first signal format.

At decision block 304, the RMD adaptor 102 determines whether the first signal format is supported by a remote management device. For example, the controller 104 may determine whether the first signal format associated with the first signal received by the communication interface 108 through the communication connection 202 is supported by the RMD 120. To determine whether the first signal format is supported by the RMD 120, the controller 104 may analyze the first signal to identify the first signal format. In some examples, the first signal format may correspond to or represent at least a particular electrical signal characteristic associated with the first signal, such as a voltage level (e.g., high voltage or low voltage), a timing, a pattern (e.g., a square wave, a triangular wave, or a pulse width), a voltage swing, a transition (e.g., from a high voltage to a low voltage), a duration, or a duty cycle of the first signal.

In some examples, the first signal format may correspond to a particular arrangement of signal connections (e.g., a configuration or an order of signal wires). For example, the first signal format may correspond to utilizing a first signal wire associated with the RMD 120 for transmitting a host status of the computing system 100, utilizing a second signal wire associated with the RMD 120 for transmitting a power signal received from the computing system 100, and utilizing a third signal wire associated with the RMD 120 for transmitting ground voltage from the computing system 100. In some examples, one signal format may use a plurality of wires to indicate particular data (e.g., host status) and another signal format may use a different plurality of wires or a different quantity (e.g., one wire, three wires, etc.) to indicate the particular data.

In some examples, the first signal format may correspond to a combination of a particular electrical signal character- istic and a particular arrangement of signal or wire connec- tions. For example, the first signal format may correspond to using a high voltage (e.g., 3.3 V) on a first signal wire and a low voltage (e.g., 0 V) on a second signal wire to represent a particular status (e.g., a power on state or a power off state), a particular control signal (e.g., a power control signal), or a particular data signal associated with the RMD 120 and/or the mainboard 140. Further, the controller 104 may communicate with the RMD 120 through the commu- nication connection 220 to obtain particular information for determining whether the first signal format identified is supported by the RMD 120.

In some examples, the particular information may be stored in a storage element of the RMD 120 using a data structure (e.g., a table) that specifies, defines, or lists signal formats supported by the RMD 120, and may be obtained by the controller 104 through the communication connection 220. For example, by analyzing the first signal or based on an indication provided by the host interface 142, the con- troller 104 may identify that the first signal format is compatible with a signal format defined by the ATX speci- fication. Based on the particular information obtained from the RMD 120, the controller 104 may determine that the RMD 120 may not support the signal format defined by the ATX specification. As such, the controller 104 may deter- mine that the first signal format is unsupported by the RMD 120.

In some examples, the controller 104 may determine whether a particular signal format is supported by the RMD 120 and/or the mainboard 140 by comparing an electrical signal characteristic associated with one or more signal connections with an electrical signal characteristic expected under certain operation condition(s). For example, when the RMD 120 is in a power on state, the controller 104 may determine whether the RMD 120 supports a particular signal format based on voltage level(s) of some signal connection(s) associated with the RMD 120. More specifi- cally, the controller 104 may determine that if the RMD 120 supports the particular signal format, a particular signal wire of the RMD 120 should be at a high voltage (e.g., 5 V) when the RMD 120 is in the power on state. As such, if the controller 104 detects that the particular wire of the RMD 120 is at a low voltage (e.g., 0 V) when the RMD 120 is in the power on state, the controller 104 may determine that the RMD 120 does not support the particular signal format.

The process 300 then varies according to whether the first signal format is supported by the remote management device, as determined at the decision block 304. If the first signal format is supported by the remote management device, the process 300 proceeds to block 308.

At block 308, the controller 104 may transmit the first signal of the first signal format to the remote management device. For example, the controller 104 may transmit the first signal (e.g., a host status signal of the computing system 100, a data signal from the computing system 100, or other communication signals of the computing system 100) of the first signal format through the communication connection 204 to the host interface 122 of the RMD 120. In this example, no signal format conversion is performed by the controller 104 because the first signal format is supported by the mainboard 140 as well as the RMD 120.

If at the decision block 304 it is determined that the first signal format is unsupported by the remote management device, the process 300 proceeds to block 310 rather than block 308.

At block 310, the controller 104 may determine signal format(s) supported by the RMD 120 based on the particular information discussed above. For example, based on the particular information that specifies, defines, or lists signal format(s) supported by the RMD 120, the controller 104 may determine that a second signal format is supported by the RMD 120.

At block 312, responsive to determining that the second signal format is one of the signal format(s) supported by the remote management device, the RMD adaptor 102 may convert the first signal of the first signal format to a second signal of the second signal format. For example, the con- troller 104 may convert the first signal of the first signal format received from the communication connection 202 to the second signal of the second signal format for transmit- ting to the host interface 122 through the communication connection 204.

In some examples, the second signal transmitted over the communication connection 204 may include an indication of the status (e.g., a host status) of the computing system 100 in a format that is supported by the RMD 120. Alternatively, the second signal may correspond to other communication signals (e.g., a data signal, a control signal, etc.) transmitted between the computing system 100 and the RMD 120.

At block 314, the RMD adaptor 102 transmits the second signal of the second signal format to the remote management device for accessing the host device. For example, the controller 104 may transmit the second signal of the second signal format to the RMD 120 through the communication connection 204 for the RMD 120 to access the computing system 100.

Additionally and/or optionally, some or all of the process 300 may be leveraged or implemented by the RMD adaptor 102 to process multiple signals of same or different types either concurrently, in parallel, or in serial. In some examples, the RMD adaptor 102 may convert a power control signal of a first signal format to a power control signal of a second signal format for transmitting between the computing system 100 and the RMD 120. In some examples, the RMD adaptor 102 may convert a power control signal of a first signal format to a power control signal of a second signal format, and concurrently convert a data signal of a first signal format to a data signal of a second signal for transmitting between the computing system 100 and the RMD 120. In some examples, the RMD adaptor 102 may convert a power control signal of a first signal format to a power control signal of a second signal format, and concurrently or serially convert a host status signal of a first signal format to a host status signal of a second signal format for transmitting between the computing system 100 and the RMD 120.

Although FIG. 3 is described as receiving a signal from a host device for provisioning to the remote management device, it should be understood that the process 300 may be applied in the opposite direction. In other words, the RMD adaptor 102 may receive a signal from the RMD 120 and may determine whether to convert the signal to a different format before providing the signal to a host device (e.g., the computing system 100).

In some examples, prior to, concurrent to, or after implementing the process 300, the RMD adaptor 102 may facilitate power sourcing from the computing system 100 to supply power to the RMD 120. For example, the RMD adaptor 102 may receive electrical power from the computing system 100 through the communication connection 210. The RMD adaptor 102 may then supply the electrical power to the RMD 120 through the communication connection 212. More specifically, to supply the electrical power to the RMD 120, the RMD adaptor 102 may measure the electrical power received from the computing system 100 (e.g., the power supply 150 or the mainboard 140), and determine that the electrical power satisfies a criterion. For example, the RMD adaptor 102 may determine that a voltage of the electrical power is within a particular range. In response to determining that the electrical power satisfies the criterion, the RMD adaptor 102 may regulate the electrical power to be supplied to the RMD 120 or output a power signal through the communication connection 212 to the RMD 120. The power signal may meet an input power specification associated with the RMD 120.

As will be appreciated by one of skill in the art in light of the present disclosure, certain examples disclosed herein improve the ability of computing devices, such as enabling a remote management device to manage more types of host devices through a remote management device adaptor that may be programmable through firmware updates. Specifically, the presently disclosed examples address technical problems inherent within computing systems: limited interoperability or compatibility between a remote management device and host devices. These technical problems are addressed by the various technical solutions described herein, including the use of a remote management device adaptor (e.g., the RMD adaptor 102) that converts a first signal received from a host device that is unsupported by a remote management device to a second signal that is supported by the remote management device, and transmit the second signal to the remote management device. Thus, the present disclosure represents an improvement in computing systems.

It should be noted that the description and the figures above merely illustrate the principles of the present subject matter along with examples described herein and should not be construed as a limitation to the present subject matter. It is thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

Terminology

It is to be understood that not necessarily all objects or advantages may be achieved in accordance with any particular example described herein. Thus, for example, those skilled in the art will recognize that some examples may be operated in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (for example, not all described acts or events are necessary for the practice of the algorithms). Moreover, in some examples, acts or events can be performed concurrently, for example, through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combination of the same, or the like. A processor can include electrical circuitry to process computer-executable instructions. In some examples, a processor includes an FPGA or other programmable device that performs logic operations without processing computer-executable instructions. A processor can also be implemented as a combination of computing devices, for example, a combination of a DSP and a microprocessor, a plurality of microprocessors, microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the examples disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some examples, such processes or portions thereof may be implemented on multiple computing devices and/or multiple processors, serially or in parallel.

Conditional language such as, among others, "can," "could," "might" or "may," unless specifically stated otherwise, are otherwise understood within the context as used in general to convey that some examples include, while other examples do not include, some features, elements and/or steps. Thus, such conditional language is not generally intended to imply that features, elements and/or steps are in any way for examples or that examples necessarily include logic for deciding, with or without user input or prompting, whether these features, elements and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate examples are included within the scope of the examples described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A remote management device adaptor comprising:
a first communication interface communicatively connected to a host device;
a second communication interface communicatively connected to a remote management device; and
a controller to:
receive power from the host device;
supply the power to the remote management device;
receive, through the first communication interface, a first signal of a first signal format from the host device, the first signal corresponding to a host status of the host device;
convert the first signal of the first signal format to a second signal of a second signal format, the second signal comprising an indication of the host status in a format supported by the remote management device; and
transmit, through the second communication interface, the second signal of the second signal format to the remote management device for managing the host device,
wherein the first signal format is supported by the host device and unsupported by the remote management device, and wherein the second signal format is unsupported by the host device and supported by the remote management device.

2. The remote management device adaptor of claim 1, wherein the controller is to:
determine that the first signal format is unsupported by the remote management device and that the second signal format is supported by the remote management device,
wherein responsive to determining that the first signal format is unsupported by the remote management device and that the second signal format is supported by the remote management device, the controller converts the first signal of the first signal format to the second signal of the second signal format.

3. The remote management device adaptor of claim 1, wherein the controller is to:
receive, through the second communication interface, a third signal of the second signal format from the remote management device, the third signal corresponding to a power control operation on the host device;
convert the third signal of the second signal format to a fourth signal of the first signal format; and
transmit, through the first communication interface, the fourth signal of the first signal format to the host device to cause the host device to be turned on or off.

4. The remote management device adaptor of claim 1, wherein the second communication interface is communicatively connected to the remote management device through a communication connection that is an Inter-Integrated Circuit (I2C), an Improved Inter-Integrated Circuit (I3C), a Universal Asynchronous Receiver/Transmitter (UART), a Bluetooth connection, a near-field communication (NFC), a Wi-Fi connection, a Zigbee connection, or a Serial Peripheral Interface (SPI).

5. The remote management device adaptor of claim 1, wherein the second communication interface comprises a proprietary communication interface, and wherein the first communication interface comprises a standard communication interface.

6. The remote management device adaptor of claim 1, wherein the controller receives the first signal from the host device through a first pin of the first communication interface, and wherein the first pin of the first communication interface is a general purpose input/output (GPIO) pin of the remote management device adaptor.

7. The remote management device adaptor of claim 6, wherein the GPIO pin of the remote management device adaptor is reconfigurable through a firmware update.

8. The remote management device adaptor of claim 1, wherein the remote management device adaptor connects to a connector of a mainboard of the host device.

9. A computing system comprising:
a mainboard; and
a remote management device adaptor to:
  receive power from the mainboard;
  supply the power to a remote management device;
  receive a first signal of a first signal format from the mainboard, the first signal corresponding to a status of the computing system;
  convert the first signal of the first signal format to a second signal of a second signal format, the second signal comprising an indication of the status of the computing system in a format supported by the remote management device; and
  transmit the second signal of the second signal format to the remote management device,
  wherein the first signal format is supported by the mainboard and unsupported by the remote management device, and wherein the second signal format is unsupported by the mainboard and supported by the remote management device.

10. The computing system of claim 9, wherein the remote management device adaptor is to:
  receive, from the mainboard, electrical power;
  measure the electrical power received from the mainboard;
  determine that the electrical power satisfies a criterion; and
  in response to determining that the electrical power satisfies the criterion, output a power signal to the remote management device.

11. The computing system of claim 9, wherein, to convert the first signal of the first signal format to the second signal of the second signal format, the remote management device adaptor adjusts a timing of the first signal.

12. The computing system of claim 9, wherein the remote management device adaptor is to:
  receive a third signal of the second signal format from the remote management device, the third signal corresponding to a power control operation on the mainboard;
  convert the third signal of the second signal format to a fourth signal of the first signal format; and

22 transmit the fourth signal of the first signal format to the mainboard to cause the mainboard to be turned on or off.

13. The computing system of claim 9, wherein the remote management device adaptor is to:
  receive a firmware update from the remote management device; and
  update a firmware associated with the remote management device adaptor using the firmware update.

14. The computing system of claim 13, wherein the firmware associated with the remote management device adaptor is authenticated by the remote management device.

15. A method for facilitating communications between a host device and a remote management device, the method comprising:
  by a remote management device adaptor,
    receiving power from the host device;
    supplying the power to the remote management device;
    receiving a first signal of a first signal format from the host device;
    determining that the first signal format is unsupported by the remote management device;
    determining that a second signal format is supported by the remote management device;
    responsive to determining that the first signal format is unsupported by the remote management device and that the second signal format is supported by the remote management device, converting the first signal of the first signal format to a second signal of the second signal format; and
    transmitting the second signal of the second signal format to the remote management device for managing the host device,
    wherein the first signal format is supported by the host device, and wherein the second signal format is unsupported by the host device.

16. The method of claim 15, wherein supplying the power to the remote management device comprises:
  measuring the power received from the host device;
  determining that the power satisfies a criterion; and
  in response to determining that the power satisfies the criterion, regulating the power to be supplied to the remote management device.

17. The method of claim 16, wherein the first signal corresponds to a host status of the host device, and wherein the second signal comprises an indication of the host status in a format supported by the remote management device.

18. The method of claim 17, further comprising:
  by the remote management device adaptor,
    receiving a third signal of the second signal format from the remote management device, the third signal generated based on the host status of the host device;
    converting the third signal of the second signal format to a fourth signal of the first signal format; and
    transmitting the fourth signal of the first signal format to the host device to cause the host device to be turned on or off.

19. The method of claim 15, further comprising:
  by the remote management device adaptor,
    receiving a firmware update from the remote management device; and
    updating a firmware associated with the remote management device adaptor using the firmware update.

* * * * *